United States Patent
Huber et al.

(10) Patent No.: US 12,151,283 B2
(45) Date of Patent: Nov. 26, 2024

(54) METHOD FOR PRODUCING A MOLDED PART, MOLDED PART AND METHOD FOR PRODUCING A COMPONENT

(71) Applicant: Bayerische Motoren Werke Aktiengesellschaft, Munich (DE)

(72) Inventors: Manfred Huber, Rottenburg (DE); Tim Mittler, Pfaffenhofen a. d. Ilm (DE); Patrick Saal, Wartenberg (DE); Andreas Sachsenhauser, Ergolding (DE); Thomas Summer, Hohenthann (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 18/028,163

(22) PCT Filed: Oct. 4, 2021

(86) PCT No.: PCT/EP2021/077214
§ 371 (c)(1),
(2) Date: Mar. 23, 2023

(87) PCT Pub. No.: WO2022/084010
PCT Pub. Date: Apr. 28, 2022

(65) Prior Publication Data
US 2024/0024949 A1  Jan. 25, 2024

(30) Foreign Application Priority Data

Oct. 23, 2020 (DE) ................ 10 2020 127 931.0

(51) Int. Cl.
*B22C 9/10* (2006.01)
*B22C 9/02* (2006.01)
(Continued)

(52) U.S. Cl.
CPC ............... *B22C 9/10* (2013.01); *B22C 9/02* (2013.01); *B22C 9/12* (2013.01); *B33Y 10/00* (2014.12); *B33Y 80/00* (2014.12)

(58) Field of Classification Search
CPC .............. B22C 9/02; B22C 9/10; B33Y 10/00
See application file for complete search history.

(56) References Cited

U.S. PATENT DOCUMENTS 2,834,077 A * 5/1958 Greis ................... B22C 9/10
164/32
6,155,331 A * 12/2000 Langer ................. B22C 1/00
164/4.1
(Continued)

FOREIGN PATENT DOCUMENTS

DE  10 2018 216 271 A1  3/2020
EP     1 952 914 A2     8/2008
(Continued)

OTHER PUBLICATIONS

International Search Report (PCT/ISA/210) issued in PCT Application No. PCT/EP2021/077214 dated Dec. 14, 2021 with English translation (four (4) pages).
(Continued)

*Primary Examiner* — Kevin E Yoon
(74) *Attorney, Agent, or Firm* — Crowell & Moring LLP

(57) ABSTRACT

A method for producing a molded part for use in a casting method may involve an additive manufacturing process. The method may also include introducing at least one relief joint into the molded part during production in order to prevent or reduce tensile stresses in the molded part.

16 Claims, 1 Drawing Sheet

(51) Int. Cl.
  *B22C 9/12*     (2006.01)
  *B33Y 10/00*    (2015.01)
  *B33Y 80/00*    (2015.01)

(56) References Cited

U.S. PATENT DOCUMENTS

2018/0161866 A1   6/2018   Deines et al.
2020/0096020 A1   3/2020   Funsch et al.

FOREIGN PATENT DOCUMENTS

WO   WO-2018159616 A1 *  9/2018  ............. B22C 1/224
WO   WO 2019/108126 A1   6/2019

OTHER PUBLICATIONS

German-language Written Opinion (PCT/ISA/237) issued in PCT Application No. PCT/EP2021/077214 dated Dec. 14, 2021 (three (3) pages).

German-language Search Report issued in German Application No. 10 2020 127 931.0 dated Apr. 17, 2021 with partial English translation (10 pages).

Ramakrishnan, "3-D-Drucken Mit Einem Anorganischen Formstoffsystem", Technische Universitaet Muenchen, 2016, pp. 1-152, (152 pages).

* cited by examiner

METHOD FOR PRODUCING A MOLDED PART, MOLDED PART AND METHOD FOR PRODUCING A COMPONENT

BACKGROUND AND SUMMARY

The present invention relates to a method for producing a molded part for use in a casting method, to a molded part, in particular a casting core, and to a method for producing a component.

The practice of producing molded parts, such as casting cores, via additive manufacturing methods is known from the prior art. This is necessary because the geometry of the cores is often so complicated that other methods for core production are less suitable. Water jacket cores, such as those used in the production of internal combustion engines, e.g. for passenger cars, have such a complicated geometry, for example. DE 10 2018 216 271 A1 discloses a sand core for use in a method for producing a housing block that has a channel structure, wherein the sand core is produced by a generative method. In practice, however, the problem has arisen that cracks may occur in the cores produced in this way, caused, for example, by residual stresses. Such cores cannot be used or, when used, lead to rejects.

It is therefore an object of the present invention to provide a method for producing a molded part, a molded part and a method for producing a component, wherein the above-described problem is avoided in a cost-effective manner.

This object is achieved by methods and a molded part as described herein. Advantages and features will become apparent this disclosure.

According to the invention, a method for producing a molded part for use in a casting method, wherein the molded part is produced via additive production, comprises the step of: introducing at least one relief joint into the molded part during the production of the molded part in order to avoid or reduce stresses in the molded part.

The stresses are, in particular, residual stress or tensile stress or, in general, stresses or forces (in the molded part) which lead to the molded part being damaged, in particular, for example, at least locally, breaking or cracking. Typically, (residual) stresses can occur in sections or regions of the molded part within the context of the production of the molded part or also during further use, possibly making the molded part unusable for further use. Such stresses can arise, for example, as a result of a hindrance to thermal expansion/shrinkage during the (thermal) curing process of the molded parts in the context of additive manufacture. Susceptibility to cracking can also be induced by stresses induced mechanically and/or thermally during the casting process. In order to counteract these problems, it is now proposed to selectively introduce at least one relief joint into the critical region or regions, thereby, in particular, enabling uncontrolled crack formation to be avoided.

According to one embodiment, the method comprises the step of: forming the relief joint by introducing a gap which penetrates the molded part at least in some region or regions.

Such a gap or slot acts like a floating bearing in the region at risk of cracking. The residual stresses can be reduced or avoided in the direction of stress by introducing a specific material aperture, for example in the form of a gap or slot, which results in a degree of expansion/displacement freedom. The relief joint thus advantageously opens up an additional degree of freedom, or at least one additional degree of freedom, for the expansion/displacement of the relevant region of the molded part, thus preventing the buildup of significant (residual) stresses, for example in the printing/curing process, from the outset.

In this case, the relief joint is expediently configured in such a way that penetration of molten cast metal is not possible, or is at least largely avoided. For this purpose, the gap is expediently of correspondingly thin design. Alternatively, the relief joint is, as far as possible, expediently relocated into a region which is easily accessible for finishing work, thereby enabling any casting burr or the like to be removed with little effort.

According to one embodiment, the method comprises the step of: forming the relief joint in such a way that the adjoining or arising molded part sections cannot be displaced relative to one another in at least one spatial direction.

Expediently, this step makes it possible for the molded part sections to be secured and fixed or held relative to one another despite the additional degree of freedom.

According to one preferred embodiment, the relief joint is of correspondingly offset or stepped, in particular multi-step, design. According to one embodiment, the relief joint forms at least one pocket or at least one undercut.

As already mentioned, the relief joint is designed as a gap or slot which penetrates the molded part at least in some region or regions. According to one embodiment, the gap or slot is not completely continuous. For example, small connecting elements, such as connecting webs, can be formed between the molded part sections, which act as small predetermined breaking points and facilitate the handling of the core since they provide stability. It may also be possible from the outset to form the slot or web in such a way that it is not completely continuous.

According to one embodiment, the method comprises the step of: creating the relief joint by selective non-solidification of the starting material during the production of the molded part.

The present approach is not directed to a specific additive manufacturing method. The basic approach for producing the relief joint by selective non-solidification can be applied to a wide variety of methods.

According to one embodiment, the molded part is produced with binder jetting. In binder jetting, also known as 3D printing, a powdered starting material is bonded with a binder at selected points in order to produce a workpiece, in the present case the molded part. As a particular preference, the molded part is produced with sand printing. The sand layers produced are wetted with the binder and then thermally cured. It is expedient if the method comprises the step of: creating the relief joint by selectively stopping binder input.

In other words, there is selective non-introduction of binder. After the molded part has cured, loose sand remains at the corresponding points.

Loose sand that remains in the relief joint as a result of the process advantageously ensures passive positioning of the molded part sections with respect to one another. The sliding of the loose sand balls in the relief joint allows slight movement for relief. In other words, the molded part sections can advantageously be supported relative to one another by the sand balls.

The abovementioned pocket or the undercut is advantageously designed and shaped in such a way that the loose sand/molding material remains in this region of the relief joint, thereby enabling the molded part sections to be supported relative to one another. The loose sand is thus held in the relief joint, which acts locally in a manner similar to a labyrinth seal.

It is expedient if the method comprises the step of: cleaning, in particular blowing out, the relief joint before the use of the molded part.

The blowing out can expediently be effected via compressed air. According to one embodiment, the relief joint is completely cleaned of loose sand/molding material before further use of the molded part. Further preferred cleaning methods are, inter alia, suction or shaking. Alternatively, cleaning can also be accomplished, alternatively or in combination, by displacement, in particular pivoting or turning, rotation, etc., of the molded part, thus enabling loose particles, in particular loose sand, to fall out.

According to one embodiment, the relief joint is shaped in such a way that complete removal of the (sand) particles is not possible, cf. the abovementioned undercut or the pocket. As already mentioned, the sand particles can provide passive positioning. In this case, the relief joint is expediently shaped in such a way that the particles do not fall out even during further use or handling of the molded part. If appropriate, they can remain in the relief joint during the entire casting process.

According to one preferred embodiment, the molded part is a core, in particular a sand core. According to one particularly preferred embodiment, the core is a fluid core, such as an oil chamber core and/or a water jacket core, for example that of a crankcase or particularly preferably a cylinder head of an internal combustion engine. According to one embodiment, the core is, for example, an outlet channel core or a water jacket core of a cylinder head of an internal combustion engine, preferably for a passenger car. However, the molded part is not restricted to use as a core.

According to one embodiment, the method comprises the steps of: simulated determination of a region at risk of cracking in the molded part before the production thereof; introduction of at least one relief joint into the region during the production of the molded part.

It is expedient if the relief joint or a plurality of such joints is provided in the data model on the basis of which the molded part is produced.

The invention also relates to a molded part, in particular a casting core, which is produced by the method according to the invention. The molded part is preferably used in a metal casting method, in particular in gravity casting, low-pressure casting or even die casting. With regard to use in die casting, it should be noted that alternative materials are used there for core production. Preferred metal melts are, for example, aluminum melts.

The material for the molded part depends on the further use of the molded part. When used as a molded part/core in a sand casting method or in permanent mold casting, corresponding molding material is used. Such molding materials consist of the basic molding material, the molding material binder and the molding additives. As regards the proposed approach relating to the introduction of the relief joint, there are no restrictions in terms of the choice of material with respect to the molding material.

The invention furthermore relates to a method for producing a component, wherein at least one molded part according to the invention is used for production. According to one preferred embodiment, the component is a cast component, preferably an engine component, such as, for example, a cylinder head of an internal combustion engine of a passenger car, a commercial vehicle or a motorcycle. The abovementioned examples are not to be interpreted as a restriction.

BRIEF DESCRIPTION OF THE DRAWINGS

Further advantages and features will be found in the following description of embodiments of molded parts with reference to the appended figures.

More specifically.

DETAILED DESCRIPTION

Figure 1:
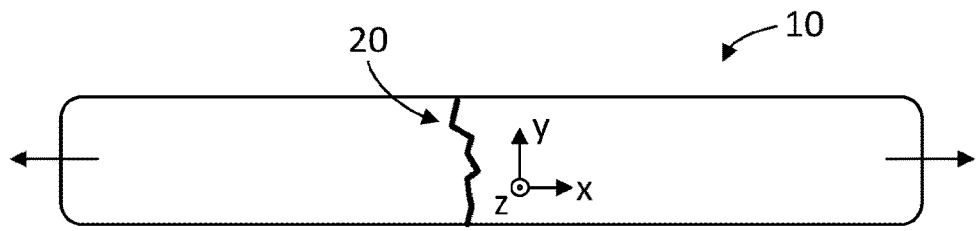
FIG. 1: shows a schematic view of a molded part to illustrate crack formation.

FIG. 1 shows schematically a molded part 10 produced, for example, by using a binder jetting process. In the core printing process and in the subsequent curing process, the binder is cured by removal of water. This gives rise to residual stresses in the molded part 10, in the present case indicated schematically by the oppositely directed arrows, which can lead to cracks, cf. in the present case the schematically illustrated crack 20. Such a molded part 10 is not suitable for further use, for example. If the molded part 10 is a casting core, for example, an undetected core fracture and/or the uncontrolled penetration of molten material into the crack during the casting of the component can render the resulting component unusable.

Figure 2:
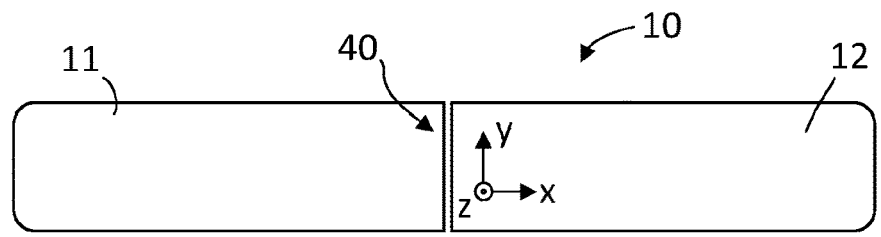
FIG. 2: shows a schematic view of one embodiment of a molded part.

FIG. 2 shows a schematic view of a molded part 10 comprising a relief joint 40. In the present case, two molded part sections 11 and 12 are formed, which can move away from one another along the x-axis, cf. the indicated coordinate system. The relief joint 40 thus opens up a degree of freedom, making it possible to prevent the buildup of significant residual stresses in the critical region, for example during the printing/curing process.

Figure 3:
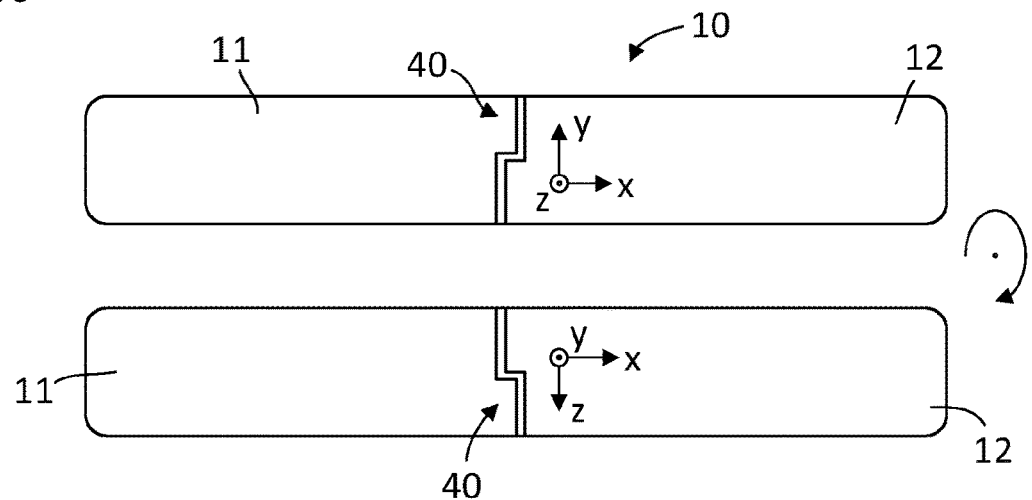
FIG. 3: shows two further views of an embodiment of a molded part.

FIG. 3 shows another embodiment of a molded part 10, comprising a relief joint 40, in a schematic illustration. In the present case, the relief joint 40 is configured in such a way that the molded part sections 11 and 12 are positioned relative to one another by form fitting. In the present case, the relief joint is of correspondingly stepped design for this purpose. In the lower half of the figure, the molded part 10 has been rotated through 90°. The relief joint is shaped in such a way that the molded part sections 11 and 12 can be supported relative to one another both in the y direction and in the z direction. Loose sand/molding material that remains in the relief joint 40 as a result of the process can ensure passive positioning of the molded part sections 11 and 12 with respect to one another. In addition, the sliding of the loose sand balls within the relief joint allows a slight movement of the two molded part sections 11 and 12 relative to one another for relief.

Figure 4:
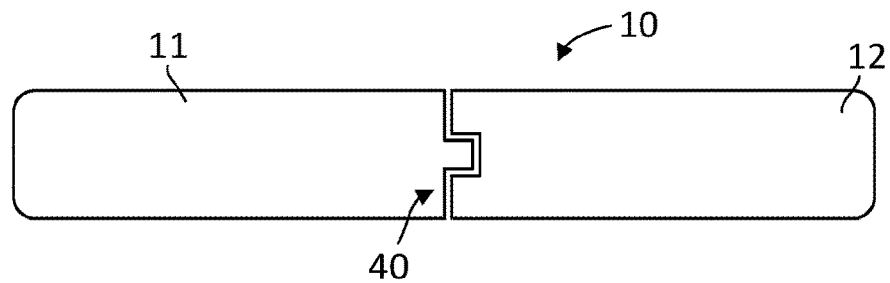
FIG. 4: shows another view of an embodiment of a molded part.

FIG. 4 shows another embodiment of a schematically illustrated molded part wherein a relief joint 40 in the present case comprises or forms a pocket or an undercut. Such an undercut can fix the molded part sections 11 and 12 in all spatial directions. Moreover, such a geometry makes it possible for sand/molding material that remains in the relief joint 40 to stay there and not to fall out accidentally during the later use of the molded part 10. This is advantageous since the two molded part sections 11 and 12 can be supported relative to one another via the loose sand in the relief joint 40, which benefits the stability of the molded part 10.

LIST OF REFERENCE SIGNS

10 molded part
11 molded part section
12 molded part section
20 crack
40 relief joint
x,y,z coordinate system, (spatial) directions

The invention claimed is:

1. A method for producing a molded part for use in a casting method,
wherein the molded part is produced with an additive manufacturing process,
comprising:
  simulated determining of a region at risk of cracking in the molded part before the production thereof; and
  introducing at least one relief joint into the region of the molded part during production in order to avoid or reduce stresses in the molded part.

2. The method according to claim 1,
further comprising:
  forming the relief joint by introducing a gap which penetrates the molded part in at least one region of the molded part.

3. The method according to claim 1,
further comprising:
  forming the relief joint such that the adjoining molded part sections are fixed relative to one another in at least one spatial direction.

4. The method according to claim 1,
wherein the relief joint includes a multi-step design.

5. The method according to claim 1,
further comprising:
  creating the relief joint by selective non-solidification of a starting material during the production of the molded part.

6. The method according to claim 1,
wherein binder jetting is used for the production of the molded part,
further comprising:
  creating the relief joint by selectively stopping binder input.

7. The method according to claim 1,
comprising:
  cleaning, by blowing out, the relief joint before the use of the molded part.

8. The method according to claim 1,
wherein the molded part includes a sand core.

9. A method for producing a molded part for use in a casting method, the method comprising:
  simulated determining of a region at risk of cracking in the molded part before the production thereof;
  forming at least a portion of the molded part via an additive manufacturing process; and
  introducing at least one relief joint into the region of the molded part during production in order to avoid or reduce stresses in the molded part.

10. The method according to claim 9,
further comprising :
  forming the relief joint by introducing a gap which penetrates the molded part in at least one region of the molded part.

11. The method according to claim 9,
further comprising:
  forming the relief joint such that the adjoining molded part sections are fixed relative to one another in at least one spatial direction.

12. The method according to claim 9,
wherein the relief joint includes a multi-step design.

13. The method according to claim 9,
further comprising:
  creating the relief joint by selective non-solidification of a starting material during the production of the molded part.

14. The method according to claim 9,
wherein binder jetting is used for the production of the molded part,
further comprising:
  creating the relief joint by selectively stopping binder input.

15. The method according to claim 9,
comprising:
  cleaning, by blowing out, the relief joint before the use of the molded part.

16. The method according to claim 9,
wherein the molded part includes a sand core.

* * * * *